Patented May 5, 1936

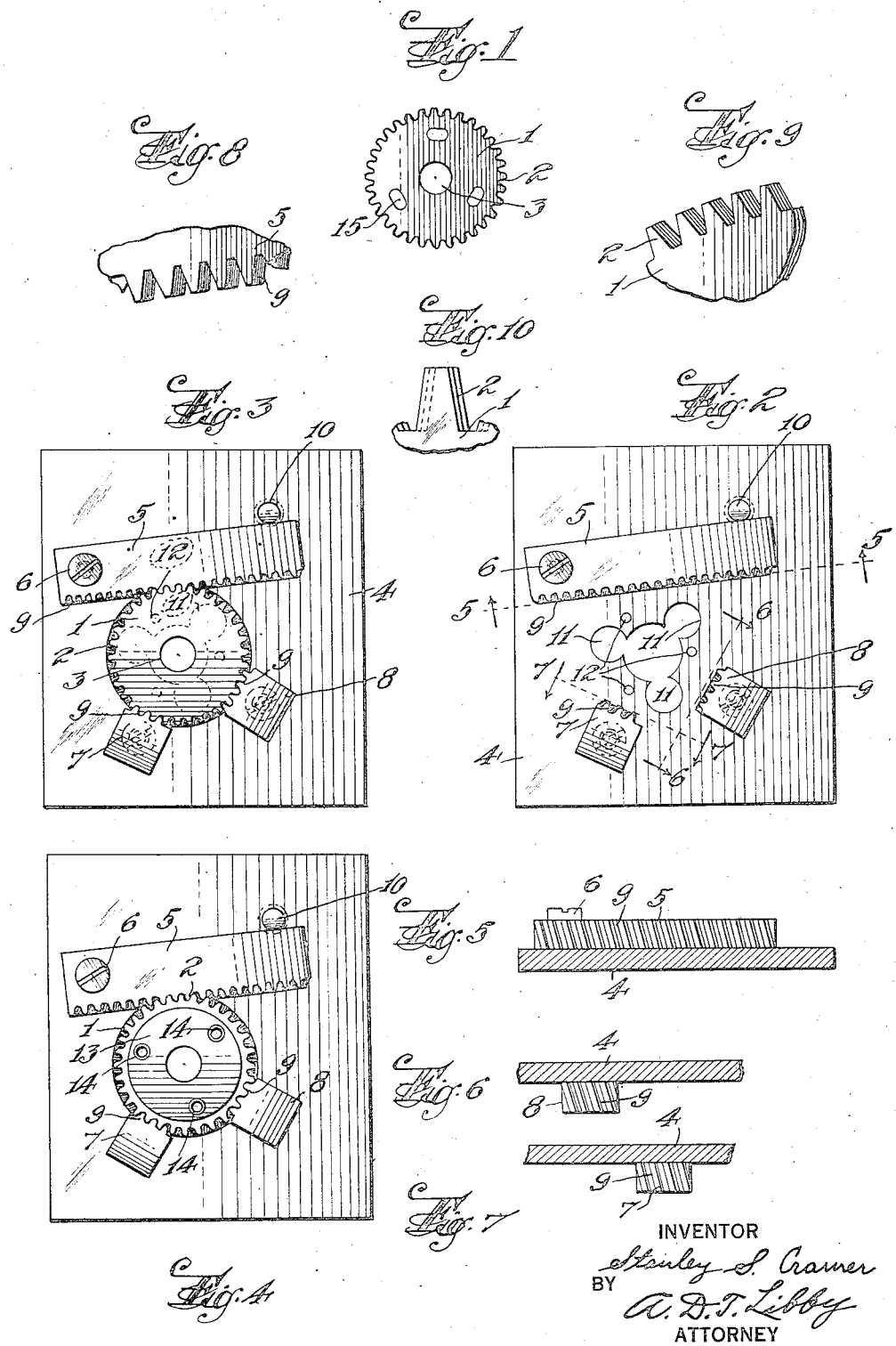

2,039,707

UNITED STATES PATENT OFFICE 2,039,707

PROCESS OF MAKING A HELICAL GEAR

Stanley S. Cramer, Haddon Heights, N. J., assignor to Radio Condenser Company, Camden, N. J.

Original application November 30, 1934, Serial No. 755,350. Divided and this application October 5, 1935, Serial No. 43,649

4 Claims. (Cl. 29—159)

This invention relates to a helical gear and the process of constructing the same this application being a division of application, Serial No. 755,350 filed November 30, 1934.

It is the principal object of my invention to provide a helical gear which can be made with the simplest kind of machinery or apparatus and without the use of special cutters or complicated dies.

I have found, after considerable study, that it is possible to construct a helical gear having a predetermined desired helix or pitch from laminations having plain spur teeth thereon. Since spur teeth are relatively simple in their design and may be readily punched on the periphery of a piece of suitable material of a chosen thickness, a gear constructed according to my process from such discs or laminations, may be made very cheaply.

My invention will be readily understood by reference to the annexed drawing, the different views of which illustrate one way in which my invention may be carried out, and wherein:

Figure 1 is a plan view of a lamination or disc having spur teeth which may be punched directly from the stock from which the gear lamination is made.

Figure 2 is a plan view of a fixture which may be used in making the helical gear from the spur gear shown in Figure 1.

Figure 3 is a view of the fixture of Figure 2, but with a stack of spur gear discs of Figure 1 in position thereon.

Figure 4 is a view similar to Figure 3, but showing a binding or clamping plate with fastening means for holding the stack of laminations comprising the gear in position.

Figure 5 is a view on the line 5—5 of Figure 2.

Figure 6 is a view on the line 6—6 of Figure 2, with the fixture tipped toward the observer at an angle of ninety degrees.

Figure 7 is a view on the line 7—7 of Figure 2, considered as in Figure 6.

Figure 8 is an enlarged view looking down on one of the assembly blocks of the fixture of Figure 2.

Figure 9 is an enlarged perspective view of a portion of the completed helical gear.

Figure 10 is an enlarged view of one of the gear teeth shown in Figure 9.

In the various views, 1 is a gear having spur teeth 2 and a center mounting hole 3. For the purpose of my process of making a helical gear from such a gear as shown in Figure 1, the gear 1 is made of any suitable relatively thin material— for example, in some cases I prefer to make this gear of non-metallic material such as fibrous material treated with some compound, micarta being illustrative of such an arrangement. When using micarta, I may use a thickness of material varying from .015" to .025", but I do not wish to be limited by these thicknesses, they being merely illustrative of thicknesses of material which I have successfully used in practice.

In carrying out my process of construction of the helical gear, I provide a fixture plate 4 having mounted thereon a plurality of assembly blocks. One of these blocks, 5, is preferably pivotally mounted to the plate 4 as by screw 6. I have found it advisable to use additional blocks 7 and 8 which may be screwed or riveted in permanently fixed position to the plate 4 in a manner as illustrated in Figure 2. Each of the blocks 5, 7 and 8 have teeth 9 cut or formed along one side or edge thereof. The teeth 9 are cut or formed at an angle to conform to the helix or pitch of the gear with which the helical gear is to function. In order to facilitate initial assembly, the block 5 is pivotally mounted on the plate 4 as has been already noted, and the plate 4 is provided with a hole 10 to receive a stop pin for permanently locating the free end of the block 5.

With the blocks 5, 7 and 8 in position, the laminations or discs 1 are stacked on the fixture between the blocks as shown in Figure 3, over the opening 11 in the plate 4 and over the jig holes 12. After a sufficient number of laminations have been stacked to give the desired thickness of gear, a clamp may be applied to the outer lamination and the fixture turned over and a drill passed through the jig holes 12 through the stack of laminations. Then a stiff metal binding plate 13 having holes already formed therein according to the spacing of the jig holes 12, is applied to the top of the stack together with fastening means 14 which may be solid or eyelet type of rivets, the latter being illustrated. Then the pin may be removed from the hole 10 and the block 5 swung away from the stack, which can then be removed by a tool engaging the stack centrally or preferably through the openings 11 and another binding plate 13 applied to what was the bottom of the stack, and the fastening means set up into final locking position, thereby completing the gear.

Due to the helical pitch of the teeth 9, each disc 1 as it is stacked on the fixture will be arcuately turned on the common axis to positions as illustrated in Figures 9 and 10, with the result that a helical gear is obtained as described.

Instead of the process of assembly as described, it is within the purview of my invention to place the bottom binding plate 13 on the fixture by use of a proper locating pin, so that the holes therein will register with the jig holes 12, so that after the fastening means 14 are inserted in position they will then protrude through the bottom binding plate. While it is preferable to punch the holes in the plates 13 when they are made, the plates may be plain blanks and drilled at the same time that the lamination stack is drilled. Furthermore, the gear discs may have holes 15 punched therein when the disc is blanked out, in which case the holes 15 are large enough to allow for the angular displacement of the disc so that when the stack of discs is completed the fastening means 14 can be inserted through these holes and the holes in the binding plates 13, but such steps are all contemplated by my process.

What I claim is:

1. The process of making a helical gear, which consists in first making a plurality of relatively thin gear discs with spur teeth thereon, making a fixture having assembly blocks spaced thereon and jig holes therein, first making said blocks with teeth therein formed at an angle corresponding to the pitch of the gear with which the gear is to function, stacking the discs on said fixture between said blocks with the spur teeth of the discs in engagement with the teeth of said blocks, then making holes with the aid of said jig holes through said discs while holding the discs, then applying to the top side of the disc stack a binding plate having holes therein corresponding to the holes made through the discs, passing fastening means through said plate and disc holes, removing the stack from the fixture and then adding another binding plate over the stack and finally setting said fastening means to holding position.

2. The process of making a helical gear, which consists in first making a plurality of relatively thin gear discs of non-metallic material with spur teeth thereon, making a fixture having assembly blocks spaced thereon and jig holes therein, first making said blocks with teeth therein formed at an angle corresponding to the helix of the gear with which the gear is to function, stacking the discs between the blocks so the spur teeth of the discs mesh with the inclined teeth on the blocks, then drilling the stack through said jig holes while holding the discs in assembled position, applying to the top of the stack a binding plate with fastening means going through holes therein and through the drilled holes in the stack, removing the assembly from the fixture and adding another binding plate to the other side of the stack and setting up the fastening means.

3. The process of making a helical gear, which consists in first making a plurality of thin discs with spur teeth thereon, assembling said discs on a fixture having parts with teeth thereon inclined according to a predetermined helix, the assembly consisting in meshing at least some of the spur teeth of the discs with the teeth on said fixture parts, then completing the gear by fastening suitable binding plates to the opposite faces of the gear.

4. The process of making a helical gear, which consists in first making a plurality of thin discs with spur teeth thereon, assembling said discs with successive laminations uniformly arcuately offset by causing the teeth therein to engage teeth formed in a fixture according to a predetermined helix, then completing the gear by fastening the laminations securely together.

STANLEY S. CRAMER.